(12) United States Patent
Smith

(10) Patent No.: US 10,503,965 B2
(45) Date of Patent: Dec. 10, 2019

(54) FITNESS SYSTEM AND METHOD FOR BASKETBALL TRAINING

(71) Applicant: Curtis Romell Smith, Tempe, AZ (US)

(72) Inventor: Curtis Romell Smith, Tempe, AZ (US)

(73) Assignee: RCM PRODUCTIONS INC., Tempe, AZ (US)

( * ) Notice: Subject to any disclaimer, the term of this patent is extended or adjusted under 35 U.S.C. 154(b) by 297 days.

(21) Appl. No.: 15/152,406

(22) Filed: May 11, 2016

(65) Prior Publication Data

US 2016/0332054 A1 Nov. 17, 2016

Related U.S. Application Data

(60) Provisional application No. 62/159,818, filed on May 11, 2015.

(51) Int. Cl.
| | |
|---|---|
| *G06K 9/00* | (2006.01) |
| *G09B 19/00* | (2006.01) |
| *G09B 5/04* | (2006.01) |
| *G06Q 20/18* | (2012.01) |
| *G07F 17/04* | (2006.01) |

(52) U.S. Cl.
CPC ......... *G06K 9/00342* (2013.01); *G06Q 20/18* (2013.01); *G07F 17/04* (2013.01); *G09B 5/04* (2013.01); *G09B 19/0038* (2013.01)

(58) Field of Classification Search
CPC ............................ G06K 9/00342; G07F 17/04; G09B 19/0038; G09B 5/04; G06Q 20/18
See application file for complete search history.

(56) References Cited

U.S. PATENT DOCUMENTS

| | | | |
|---|---|---|---|
| 8,702,485 B2 | 4/2014 | Flury et al. | |
| 2011/0119332 A1 | 5/2011 | Marshall et al. | |
| 2011/0207561 A1 | 8/2011 | Adams | |
| 2011/0244933 A1 | 10/2011 | Lee | |
| 2012/0289333 A1 | 11/2012 | Komatsumoto | |
| 2012/0316011 A1 | 12/2012 | Milosevic | |
| 2013/0090190 A1 | 4/2013 | Fuccillo et al. | |
| 2013/0095924 A1* | 4/2013 | Geisner ................... | G06F 3/012 463/32 |
| 2014/0004950 A1 | 1/2014 | Szufnara | |
| 2014/0027978 A1 | 1/2014 | Gausselin | |
| 2014/0038714 A1 | 2/2014 | Wei | |

(Continued)

*Primary Examiner* — Jeffrey S Vanderveen
(74) *Attorney, Agent, or Firm* — Snell & Wilmer, L.L.P.

(57) ABSTRACT

A fitness system for training a user to perform basketball movements is disclosed. The fitness system may include a sensor configured to detect spatial data associated with the user and a basketball. The fitness system also may include a display configured to provide a prompt associated with a particular movement, and user feedback. The fitness system also may include a movement database configured to store a plurality of movements including the particular movement, each movement including model movement data. The fitness system also may include a movement analysis unit configured to retrieve the model movement data associated with the particular movement from the movement database, determine user movement data based on the spatial data, determine user feedback data based on a comparison of the user movement data and the model movement data, and configure the display to display the user feedback based on the user feedback data.

19 Claims, 7 Drawing Sheets

(56) References Cited

U.S. PATENT DOCUMENTS

| | | |
|---|---|---|
| 2014/0056432 A1 | 2/2014 | Loui et al. |
| 2014/0058982 A1 | 2/2014 | Loui et al. |
| 2014/0094307 A1 | 4/2014 | Doolittle et al. |
| 2014/0290360 A1 | 10/2014 | Binder |
| 2014/0309058 A1* | 10/2014 | San Juan ............... A63B 69/00 473/422 |
| 2014/0364204 A1 | 12/2014 | Tornqvist |
| 2015/0018112 A1* | 1/2015 | Millers ............. A63B 69/3623 473/224 |
| 2015/0038271 A1 | 2/2015 | Jourdeans |

* cited by examiner

FITNESS SYSTEM AND METHOD FOR BASKETBALL TRAINING

CROSS-REFERENCE TO RELATED APPLICATIONS

This application claims priority to, and benefit of U.S. Provisional Application No. 62/159,818 filed on May 11, 2015, which is hereby incorporated by reference in its entirety for all purposes.

FIELD

The present disclosure generally relates to a basketball skill training system and interactive application. More particularly, the disclosure includes a system and method of tracking a position or movement of a user and a basketball and providing feedback as to the accuracy of the user position or movement, along with the basketball position or movement.

BACKGROUND

The game of basketball is a popular recreational and professional sport played across the world. Playing basketball involves a number of skills related to handling a basketball including shooting, passing, and dribbling, while also involving footwork skills and movement without the basketball. Basketball players practice such basketball skills regularly in order to maintain and improve their skills. Basketball handling is an important skill that players frequently practice. Practice drills are also used to improve a player's hand-eye coordination, muscle memory, and cardiovascular fitness, in addition to specific basketball skills. For example, basketball dribbling drills are used to gain ball handling skills. Coaches first learn the drills before teaching the drills to the players, and the players learn the drills and repeat the drills during practices.

Players may not always have access to a coach to assist, push, and motivate the player during training and practicing. For example, during the off-season, a player may desire to continue practicing, even without access to their coach and team, in order to maintain and improve their own individual skills. Without a coach, a player resorts to other sources for practice and drill ideas. A self-directed practice typically lacks competition and is less effective at pushing a player to their skill and speed limits. Additionally, a player may not know how well they are performing in a self-directed practice, because the player lacks the feedback and direction of a coached practice.

SUMMARY

A fitness system for training a user to perform basketball movements is disclosed. In various embodiments, the fitness system may include a sensor configured to detect spatial data associated with the user and a basketball. The fitness system also may include a display configured to provide a prompt associated with a particular movement, and user feedback. The fitness system also may include a movement database configured to store a plurality of movements including the particular movement, each movement including model movement data. The fitness system also may include a movement analysis unit connected to the sensor, the display, and the movement database. The movement analysis unit may be configured to retrieve the model movement data associated with the particular movement from the movement database, determine user movement data based on the spatial data, compare the user movement data and the model movement data, determine user feedback data based on the comparison of the user movement data and the model movement data, and configure the display to display the user feedback based on the user feedback data.

In any of the foregoing fitness systems, the fitness system further comprises an input unit configured to receive a user input associated with a training set, wherein the training set may include a set of movements including the particular movement.

In any of the foregoing fitness systems, the user feedback may include an audio feedback component and the fitness system further comprises a speaker configured to provide the audio feedback component of the user feedback.

In any of the foregoing fitness systems, the fitness system further comprises a transceiver configured to receive new movement data associated with a new movement, and the movement database may be configured to store the new movement data.

In any of the foregoing fitness systems, the user movement data and the model movement data are each a set of data points associated with body parts of the user and the basketball, and comparing the user movement data and the model movement data comprises comparing the respective sets of data points.

In any of the foregoing fitness systems, the comparing the respective sets of data points comprises determining a deviation between the respective sets of data points.

In any of the foregoing fitness systems, the user feedback is positive feedback when the deviation between the respective sets of data points is less than a predetermined threshold value.

In any of the foregoing fitness systems, the user feedback is negative feedback when the deviation between the respective sets of data points exceeds a predetermined threshold value.

In any of the foregoing fitness systems, the fitness system further comprises a housing configured to provide a physical connection of the sensor, the display, the movement database, and the movement analysis unit.

A method for providing an interactive training session of basketball movements is disclosed. The method may include storing, by a movement database, a plurality of movements including a particular movement, each movement including model movement data. The method also may include providing, by a display, a prompt associated with the particular movement. The method also may include detecting, by a sensor, spatial data associated with a user and a basketball. The method also may include retrieving, by a movement analysis unit, the model movement data associated with the particular movement from the movement database. The method also may include determining, by the movement analysis unit, user movement data based on the spatial data. The method also may include comparing, by the movement analysis unit, the user movement data and the model movement data. The method also may include determining, by the movement analysis unit, user feedback data based on the comparing of the user movement data and the model movement data. The method also may include providing, by the display, user feedback based on the user feedback data.

In any of the foregoing methods, the method further comprises, receiving, by an input unit, a user input associated with a training set, wherein the training set may include a set of movements including the particular movement.

In any of the foregoing methods, the user feedback may include an audio feedback component and the method further comprises providing, by a speaker, the audio feedback component of the user feedback.

In any of the foregoing methods, the method further comprises receiving, by a transceiver, new movement data associated with a new movement, and storing, by the movement database, the new movement data.

In any of the foregoing methods, the user movement data and the model movement data are each a set of data points associated with body parts of the user and the basketball, and comparing the user movement data and the model movement data comprises comparing the respective sets of data points.

In any of the foregoing methods, the comparing the respective sets of data points comprises determining a deviation between the respective sets of data points.

In any of the foregoing methods, the user feedback is positive feedback when the deviation between the respective sets of data points is less than a predetermined threshold value.

In any of the foregoing methods, the user feedback is negative feedback when the deviation between the respective sets of data points exceeds a predetermined threshold value.

A kiosk for training a user to perform basketball moves is disclosed. The kiosk may include a camera configured to detect spatial data associated with the user and a basketball. The kiosk also may include an input unit configured to receive a user input associated with a training set, wherein the training set may include a set of movements. The kiosk also may include a display configured to provide a prompt associated with each movement of the set of movements, and session feedback indicating whether a performance of the user in executing each movement of the set of movements. The kiosk also may include a movement database configured to store a plurality of movements including each movement of the set of movements. The kiosk also may include a movement analysis unit configured to determine session feedback data based on the spatial data, and configure the display to display the session feedback based on the session feedback data. The kiosk also may include a housing configured to physically connect to the camera, the display, the movement database, and the movement analysis unit.

In any of the foregoing kiosks, the kiosk further comprises a payment processing unit configured to accept and validate payment data.

In any of the foregoing kiosks, the kiosk further comprises a basketball storage compartment for storing the basketball.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

Figure 1:
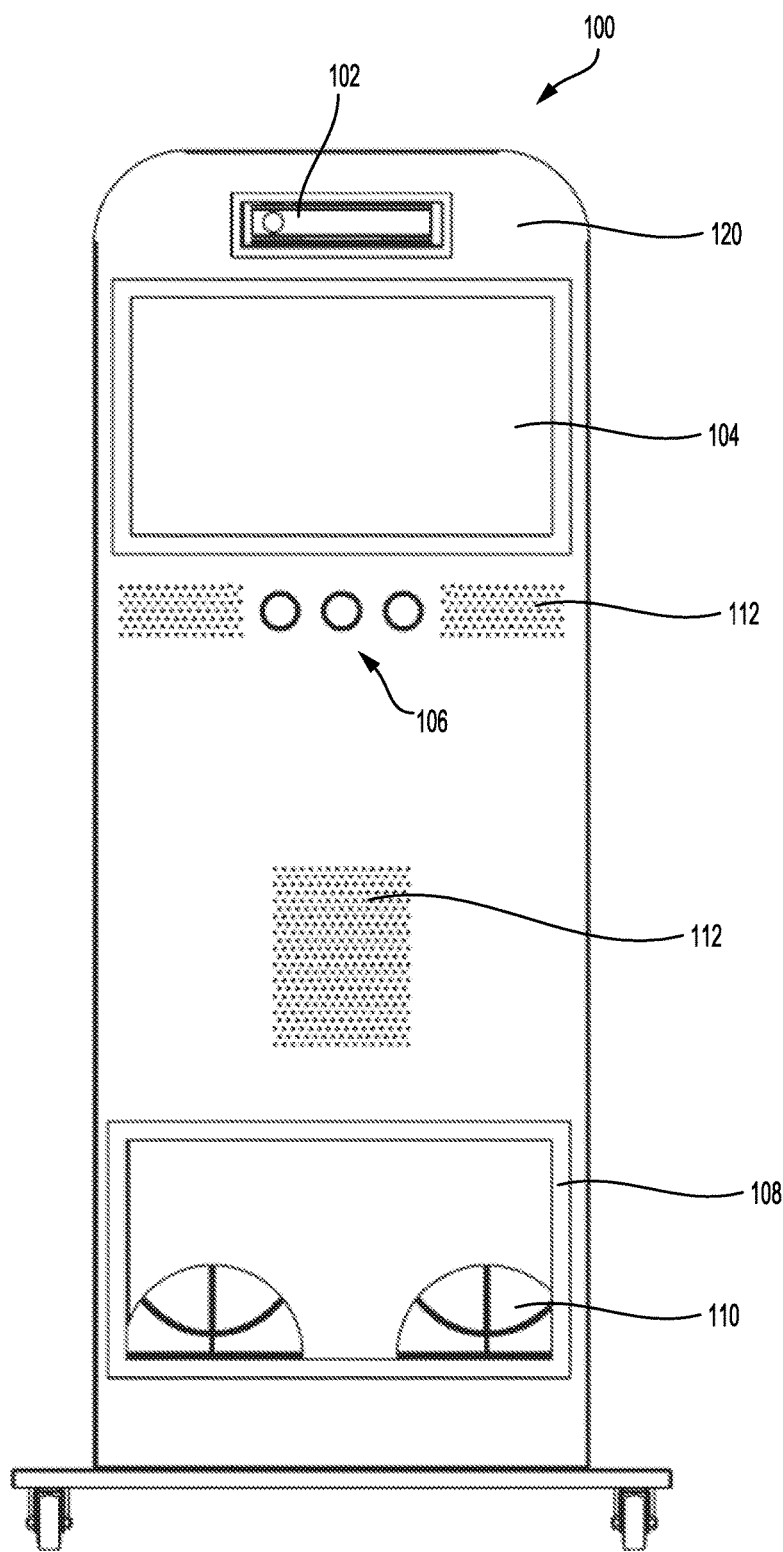
FIG. 1 illustrates a fitness system for basketball training, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented. Furthermore, any reference to singular may include plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

The present disclosure is described in one or more embodiments in the following description with reference to the figures, in which like numerals represent the same or similar elements. While the disclosure is described in terms of the best mode for achieving the disclosure's objectives, it will be appreciated by those skilled in the art that it is intended to cover alternatives, modifications, and equivalents as may be included within the spirit and scope of the disclosure as defined by the appended claims and their equivalents as supported by the following disclosure and drawings System program instructions and/or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

FIG. 1 illustrates a fitness system for basketball training 100. In various embodiments, the fitness system 100 may include a sensor 102, a display 104, an input unit 106, a basketball storage compartment 108, one or more basketballs 110, and speakers 112 inside housing 114. The fitness system 100 may be a console, a kiosk, an interactive machine, or an interactive device.

In various embodiments, the fitness system 100 may operate as an exercise machine, a motion-based basketball trainer, or cardio-based exercise machine designed to mimic the movements (or moves) of professional basketball with or without using a basketball court, hoop, or rim. As described herein, the fitness system 100 may be configured to provide an interactive application for training a user. The training may involve the user controlling, dribbling, and moving a basketball 110, while the sensor 102 tracks the movements of the user's body and movements of the basketball 110. The interactive application encourages the user to perform or mimic movements, fundamentals, and dynamics of an actual basketball game.

In various embodiments, the fitness system 100 may compare the user movements to pre-established movement criteria associated with the displayed movement goals and determines the accuracy of the user's movements. The display and speakers provide audio and visual feedback to the user to inform the user of successful movements and/or missed movements. In various embodiments, the interactive training application awards points to the user for each movement successfully matched by the user and the basketball.

In various embodiments, the sensor 102 may be configured to track movements of the user and/or basketball 110, as the user moves and/or dribbles the basketball 110 in front of the fitness system 100. In various embodiments, the sensor 102 is one or more cameras. In various embodiments, the sensor 102 is a location sensor, such as RADAR or LIDAR. In various embodiments, the sensor 102 is a sensor capable of spatial detection in three dimensions, such as a 3D camera.

In various embodiments, the display 104 may be configured to provide a series of instructions, prompts, or movement goals, which scroll across or down, and/or pop-up on, a user interface provided by the display 104. The user attempts to match the instructions, prompts, or movement goals with their body and by controlling the basketball 110. In various embodiments, the display 104 is a liquid crystal display (LCD). In various embodiments, the display 104 is a projected display.

In various embodiments, input unit 106, as shown in FIG. 1, may include multiple buttons to be used by the user to navigate through the user interface and otherwise provide input to the fitness system 100. The user may use input unit 106 to select a particular training package or training set to interact with. The user may use input unit 106 to input characteristics of the user, such as a user height, weight, experience level, fitness level, or a unique user identification used to track progress of the user.

In various embodiments, storage compartment 108 stores items such as a basketball, a cellular phone or other personal items, or a beverage.

Fitness system 100 may be placed and used in a gym, fitness club, training center, recreational center, community center, arcade, or other fitness or gaming location, or in a home setting. Fitness system 100 operates as a basketball training system and interactive application to improve user skills. Fitness system 100 may improve a user's ball-handling, practice drill execution, interactive skill development, player development, cardiovascular training, strength, and conditioning. Fitness system 100 may be considered exercise equipment, fitness equipment, or a sports training self-help item. Any type of user may utilize the fitness system disclosed herein, including aspiring basketball players, student athletes, coaches, personal trainers, skill-instructors, player development coordinators, gym members, fitness club members, recreational center members, community center members, and others who desire to play an interactive game. The fitness system provides a method for practicing, training, exercising, and practicing basketball skills, including footwork, dribbling and improving balance, control, core strength, stability, and flexibility.

Figure 2:
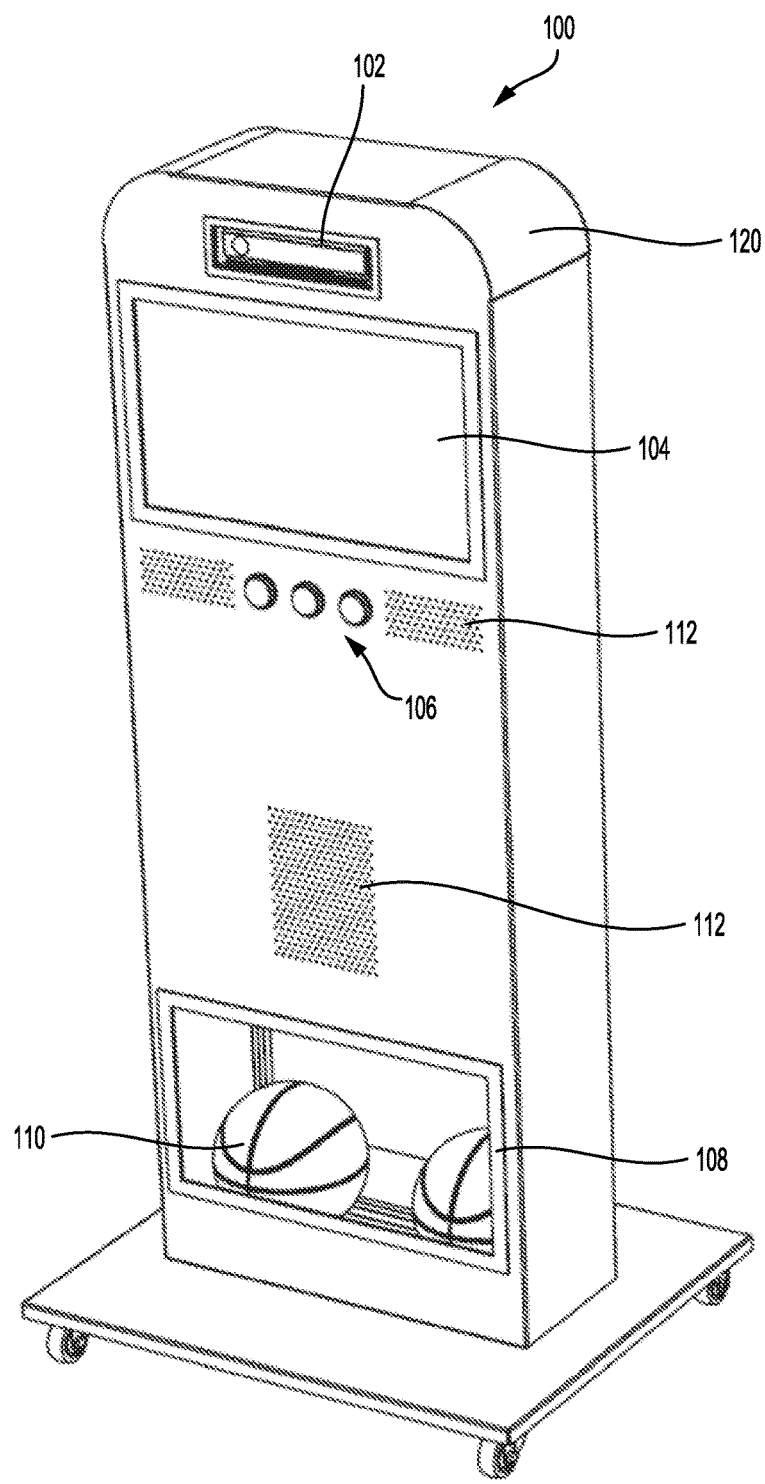
FIG. 2 illustrates a perspective view of the fitness system, in accordance with various embodiments.

FIG. 2 illustrates a perspective view of fitness system 100, including in various embodiments, sensor 102, display 104, input unit 106, basketball storage compartment 108, one or more basketballs 110, speakers 112, and housing 114. A user may use fitness system 100 by standing in a training zone or training area in front of fitness system 100. The training area can be any surface or area suitable for exercising, moving, or dribbling a basketball. The user trains using an interactive training application with or without a basketball in the training area in front of fitness system 100, or in proximity to fitness system 100 such that user can view display 104 and sensor 102 can sense the movements of the user. In various embodiments, the training area is located a distance of approximately 5 to 6 feet from fitness system 100. In various embodiments, multiple users train side-by-side in the same training area using the same fitness system 100. In yet other embodiments, multiple users train together remotely with each user training using a separate fitness system 100 and the multiple fitness systems 100 communicate by a wired or wireless internet connection, either directly to each other or to a central server configured to coordinate execution of an interactive training application session.

Figure 3:
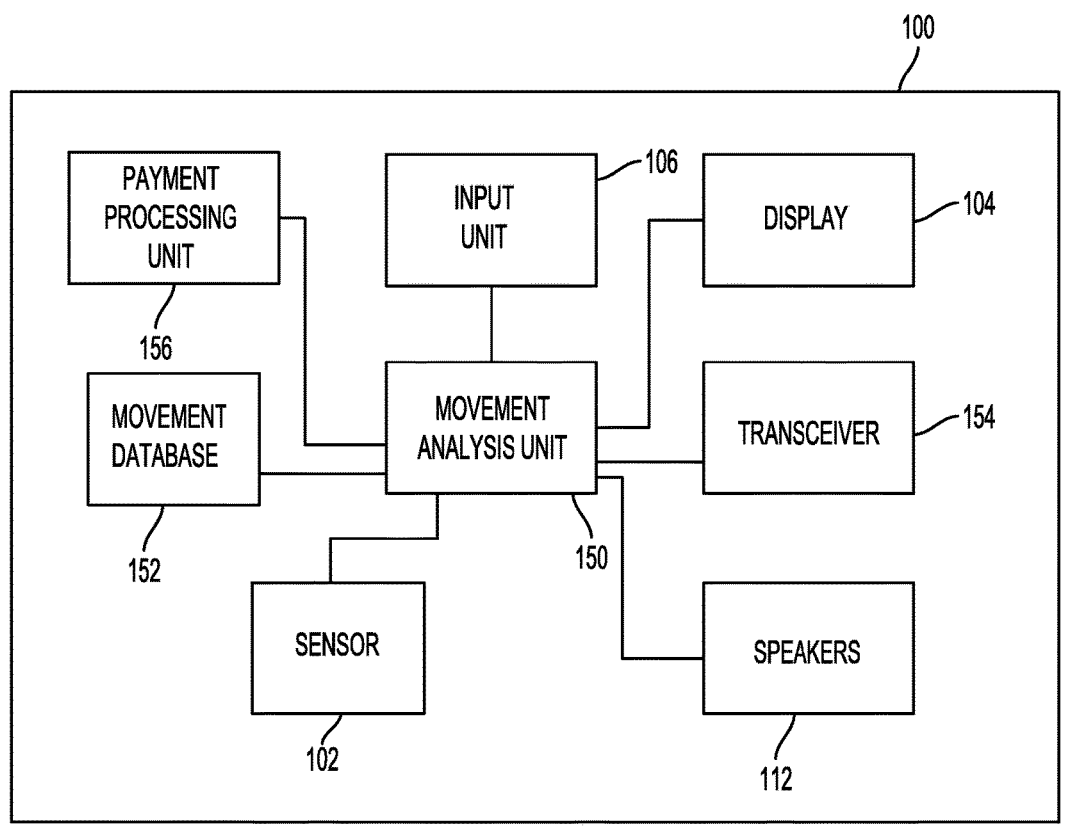
FIG. 3 illustrates a block diagram of the fitness system, in accordance with various embodiments.

FIG. 3 is a block diagram of fitness system 100. In various embodiments, fitness system 100 may be an interactive device, kiosk, console, or interactive machine which may include sensor 102, display 104, input unit 106, and speaker 112, each as described herein. In various embodiments, fitness system 100 may also include movement analysis unit 150, movement database 152, transceiver 154, and payment processing unit 156.

In various embodiments, the sensor 102 may be configured to capture spatial data associated with a user and/or a basketball 110. The sensor 102 may be a camera system which may include a red, green, and blue (RBG) camera together with a three-dimensional (3D) infrared depth sensor. A known pattern of infrared light may be projected toward the training area, while the infrared depth sensor determines the depth of objects in the training area. The sensor 102 may detect or record the user during an interactive training application session.

As described herein, the display 104 may provide a user interface and may provide instructions or prompts for the user to perform particular movements with or without the basketball 110.

Input unit 106 may include one or more buttons, a controller, a touch screen, a microphone, a sensor, a game pad, a keyboard, a joystick, a pointer device such as a mouse, or another suitable interface device. Input unit 106 may communicate user data to movement analysis unit 150, such as user height, user weight, user skill level, user fitness level, and an indication of a particular training set the user has chosen to perform. In various embodiments, input unit 106 may include a plurality of built-in physical buttons within fitness system 100 and the user may navigate an interactive application menu provided by display 104 using the physical buttons to select specific features to customize the user's training session. An interactive training application provided by the fitness system 100 may provide one or more selectable application options or features, such as number of users, training session mode, difficulty level or speed, and workout type. In another embodiment, the user may interface with fitness system 100 by interacting with sensor 102 and using movements or gestures to select application features, in combination with, or in lieu of using input unit 106.

Speakers 112 may provide music or an audio beat for the interactive training session. Speakers 112 may also be used to provide feedback to the user in the form of words or sounds. For example, when the user successfully performs a movement, the speakers 112 may provide a confirmation indication such as a spoken message "Good job" or a sound, such as a chime, squeak of sneakers on hardwood floors, swish of a basketball hitting a net, or a crowd cheer.

Movement database 152 may be configured to store movements provided by the fitness system 100 for execution by the user. In various embodiments, thousands of movements are stored in the movement database 152, more than can be memorized or recognized by a human being. In various embodiments, the movements are grouped together in a set to form a training set and associated with a training set identifier or name. For example, a training set may be named "Breaking Ankles" and may include multiple variations of crossover dribbles for execution by the user.

In various embodiments, the movement database 152 stores each movement as a series of data points of body parts and the basketball 110, which correspond to detected data points of body parts of the user. The movement database 152 may be continuously or periodically updated to include newly created movements, including the movements of professional athletes. While the movement database 152 is shown in FIG. 3 as being a part of the fitness system 100, in various embodiments, the movement database 152 may be a remote database accessible using the transceiver 154, as described herein.

In various embodiments, movement analysis unit 150 is connected to the camera 102, display 104, input unit 106, speaker 112, movement database 152, transceiver 154, and payment processing unit 156. The movement analysis unit 150 may be configured to provide an interactive training application session. Providing the interactive training application session may include creating an interactive application session for the user and configuring the display 104 based on an interactive application user interface of the interactive application session. As used herein, configuring the display 104 may include providing appropriate rendering for graphics and display associated with the display 104.

The movement analysis unit 150 may be configured to access the movement database 152 to provide a given movement to the user via the display 104. The movement analysis unit 150 is also configured to determine whether the user has correctly performed the given movement based on the spatial data detected by the sensor 102. The movement analysis unit 150 is also configured to configure the display 104 to provide feedback to the user.

The movement analysis unit 150 may parse the spatial data detected by the sensor 102 to determine data points associated with various body parts of the user and/or the basketball. The movement stored in the movement database 152 may be a set of data points, and the movement analysis unit 150 may compare the data points from the spatial data to the data points of the movement stored in the movement database 152. For example, the movement stored in the movement database 152 corresponding with a between-the-legs dribble may be a set of data points in three dimensional coordinates associated with the user's elbows, hands, wrists, forearms, hips, knees, ankles, feet, and the basketball. The movement analysis unit 150 may determine a set of data points of the user based on the spatial data, corresponding with the user's elbows, hands, wrists, forearms, hips, knees, ankles, feet, and the basketball. The movement analysis unit 150 may compare the two sets of data points and determine a deviation of the user from the stored movement. The movement analysis unit 150 determines whether the user has successfully performed the movement. In various embodiments, the user successfully performs the movement when the deviation of the user from the stored movement is below a threshold value.

In various embodiments, the movement analysis unit 150 is a specialized device for detecting successful execution of movements. In various embodiments, the movement analysis unit 150 performs evaluations at a higher rate than is capable by a human being, and at a finer level of granularity. While a coach or another individual may evaluate the user performing various movements, the movement analysis unit 150 performs a faster, more detailed, and more consistent analysis of the performance of the user. In many situations, fundamentals, which serve as the building blocks of more complex series of basketball movements, should be mastered to a high degree of precision in order to be properly learned. The level of granularity of evaluation provided by the movement analysis unit 150 provides the feedback that enables the user to achieve the high degree of precision for properly learning fundamental movements.

Movement analysis unit 150 may store code for the fitness system and interactive training application, and the code may include any suitable programming language, such as Unity, C++, Visual Basic, or other computer coding language in any dialect such as English, Spanish, or other language or dialect. Alternatively, game code is stored on external media, such as flash memory, DVD, CD, Blu-Ray, or other suitable electronic storage medium. In one example, movement analysis unit 150 may include built-in hardware and software built on Windows 8 technology with a Unity software engine.

Transceiver 154 may be configured to facilitate data transfer with another device, such as another fitness system 100 or a remote server. The transceiver 154 may be a cellular transceiver configured to transmit and receive data using a cellular network. The transceiver 154 may be a local area network transceiver, such as a wireless network device, configured to transmit and receive data using a local area network and an internet connection. The transceiver 154 may be used to update the movement database 152 with updated movements. The transceiver 154 may also be used to provide an interactive training application session with another fitness system 100. When the movement database 152 is a remote database, the transceiver 154 is used to access the movement database 152.

Transceiver 154 may also be configured to transmit and receive data to and from a user movement device configured to detect user movement data. In various embodiments, the user movement device is worn by the user and provides user movement data to more accurately monitor the movements of the user. The user movement data may be used in addition to or in lieu of the spatial data detected by the sensor 102.

Payment processing unit 156 may be configured to accept payment of currency or indicators of currency, such as credit cards, debit cards, pre-loaded account cards, or tickets. In various embodiments, the payment processing unit 156 is a specialized device used to process and verify transactions. In various embodiments, the payment processing unit 156 communicates with remote servers and/or databases via transceiver 154 in order to verify payment received.

Fitness system 100 provides several modes for a single user or for multiple users. A single user may train either with or without a basketball or may train with multiple basketballs. For example, a user may handle three basketballs in a more challenging ball handling drill. Additionally, multiple users can train with a single fitness system 100 or multiple users can train with each other remotely from separate fitness systems 100. For example, two users can train side-by-side with each other in the same playing area in front of the same fitness system 100. Alternatively, each user may train in front of a separate fitness system 100, but each user links together online to train together within the same training session. In the remote multi-user scenario, each user may have the same information provided on each user's separate display. Two users may challenge each other and compete for a higher score. In various embodiments, fitness system 100 accommodates five or more users, locally or remotely and each handling up to three basketballs.

Figure 4:
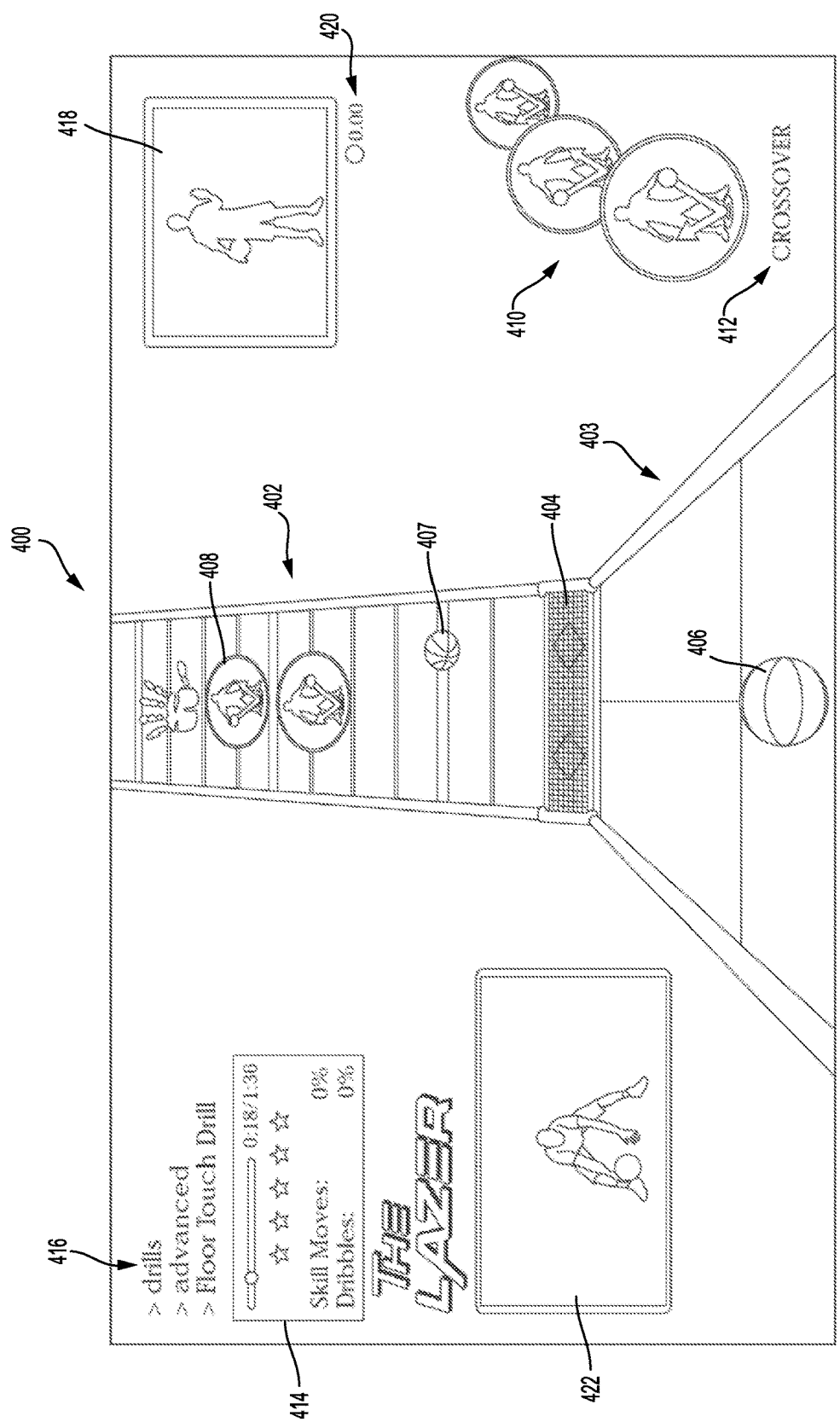
FIG. 4 illustrates an embodiment of an interactive training application of the fitness system for a single user, in accordance with various embodiments.

FIG. 4 shows an embodiment of an interactive training application that is an interactive game, and interactive application interface 400 for a single local user. Display 104 may provide the interactive application interface 400. The interactive application interface 400 may include an upper track 402 that provides the user with a series of images or prompts that cascade down the interactive application interface 400, where each image is an instruction or movement to be performed by the user. In various embodiments, images or prompts may pop-up or appear at regular time intervals and/or randomly during training session, wherein such images or prompts may be presented by display 104 in addition to or alternative to the series of images or prompts on upper track 402. In various embodiments, an image or prompt may include icon representing a movement, a pre-recorded video of an instructor performing a movement, or other prompt.

Upper track 402 displays a series of movements 408 in the form of images or icons. Each different image may represent a different movement, exercise, or basketball skill. For example, an image of a basketball 407 prompts the user to dribble the basketball 110 at the proper time, such as when the image of the basketball 407 reaches the intersection 404 of the upper track 402 and the lower track 403. In other embodiments, icons 408 may be displayed without an upper track 402 and/or lower track 203, and interactive application interface 400 may display icons 408, or other images or prompts, for example pop-ups, at regular time intervals or at random during a training session.

In various embodiments, more than one image of a basketball 407 may be shown, indicating use of multiple basketballs 110 by the user. Another image 408 may show an icon or outline of a user performing a particular basketball move, which prompts the user to perform the movement at the proper time, such as when the icon 408 reaches the intersection 404 of the upper track 402 and the lower track 403. In various embodiments, an image or icon 408 may prompt user to perform a training exercise, such as a footwork or agility movement. In various embodiments, the user performs the movements in time with music or an audio beat. In other embodiments, the movements are not synchronized with a beat and may be randomly presented.

Examples of offensive skill movements that may be displayed on upper track 402, which may or may not involve dribbling the basketball, include crossover, between-the-legs, reverse between-the-legs, behind-the-back, pull dribble, flow dribble, Hopkins, reverse Hopkins, pump fake, jab step, reverse jab step, side pass, around-the-world, fake jump fake, hesitation, curl dribble, spin move, scorpion, and other movements. Further examples of offensive skill movements that may be displayed on upper track 402 which may or may not involve shooting the basketball, include jump shot, simulation jump shot, free throw, or other movements. Examples of defensive skill movements that may be displayed on upper track 402 include left and right slides, jumping in passing lanes, on-ball denial, setting up for a charge, blocking shots, and other movements. In various embodiments, a skill or movement is modeled after a favorite or signature movement of a real professional basketball player. Thus, the user can learn and practice current and new basketball movements that professional players use. The movements may be demonstrated by a professional in movement demonstration section 422.

The interactive application interface 400 may include a lower track 403 with an image of a basketball 406. Lower track 403 reflects the location of the actual basketball 110 being handled by the user. For example, if the user is handling the basketball 110 with the user's left hand, the left side of lower track 403 will illuminate and the image of the basketball 406 will be shown on the left side. Similarly, while the user handles the basketball 110 with the user's right hand, the right side of lower track 403 will illuminate and the image of the basketball 406 will be shown on the right side. Colors and lights may also be displayed on the side of lower track 403 and correlates with location of the user's actual basketball 110.

In this regard, upper track 402 provides movement goals 407 and 408, while lower track 403 provides immediate feedback as to whether the movement goal 407 and 408 was matched. The user keeps the user's eyes on display 104 to watch for upcoming movements 407 and 408 and thus, learns to dribble and handle the basketball 110 with the user's eyes up, without looking at the basketball 110. Therefore, the interactive training application and system helps users practice valuable basketball skills, in particular, ball handling while keeping the user's eyes focused on the surrounding environment, rather than watching the ball in hand.

The images or icons 407 and 408 which operate as user prompts may include instructions, such as arrows or other text or graphics, and may include a color that is associated with the type of movement. For example, blue may represent a crossover move, green may represent a between-the legs move, yellow may represent a jab step, and other colors or color combinations may represent different skills or movements. The color coding allows the user to more easily associate a particular icon with a movement. One or more arrows displayed with the image or icon may further represent the direction the ball should be moved by the user in order to accomplish the movement goal. In various embodiments, an icon 408 may prompt the user to perform a movement without dribbling the basketball or in addition to dribbling the basketball. For example, an icon, such as a hand print, may prompt user to touch the floor. In various embodiments, an icon 408 may prompt the user to perform a movement using additional training gear, such as a medicine ball, tennis ball, resistance band, chair, and/or other obstacle or training device. Interactive application interface 400 may indicate to the user during an initial selection that a particular workout incorporates additional training gear.

The interactive application interface 400 also may include user feedback area 418. As the user performs the various movements and skills displayed on upper track 402, the user's image is captured by the sensor 102 and display 104 may be configured to provide an image of the user in user feedback area 418. User feedback area 418 displays a real-time reflection of the position and movements of the user and the basketball 110. Capture quality indicator 420 may provide an indication to the user as to the quality of the image data capturing by the sensor 102. The user may adjust lighting or positioning of the user based on the information provided by the capture quality indicator 420.

The interactive application interface 400 also prepares the user for upcoming prompts by showing an enlarged view of the upcoming image or icons in carousel area 410, as well as the upcoming movement name 412 in text. As upper track 402 moves each image or icon down the track, carousel area 410 also rotates with each upcoming movement shown in the front position of carousel area 410. In other embodiments, carousel area 410 may be used in place of upper track 402 and lower track 403 to display the images or icons 408.

The interactive application interface 400 shows the user's score 414 in the form of symbols or alphanumeric text. In various embodiments, the user's score 414 is represented by stars. In various embodiments, the user's score 414 is represented by a percentage of skill movements and/or dribbles successfully executed. The user's score 414 may also include a progress bar of how far the user has progressed through the interactive training application session.

The interactive application interface 400 shows the name of the workout, settings, or other information in information area 416. In information area 416, additional information about the training session or about the user, such as heart rate, calories burned, or other physical attributes of the user may be provided. The information displayed in lower track 403, user feedback area 418, user's score 414, as well as information area 416 each represent feedback displayed for the user. The feedback information is interpreted by the user to motivate the user and assist the user in improving the user's performance. Any combination of user feedback may be displayed to assist the user in improving the user's ability to perform the basketball skills at the indicated time. In various embodiments, additional timing numbers may be provided to further assist the user in performing the indicated movements and/or dribbles at the correct time.

Figure 5:
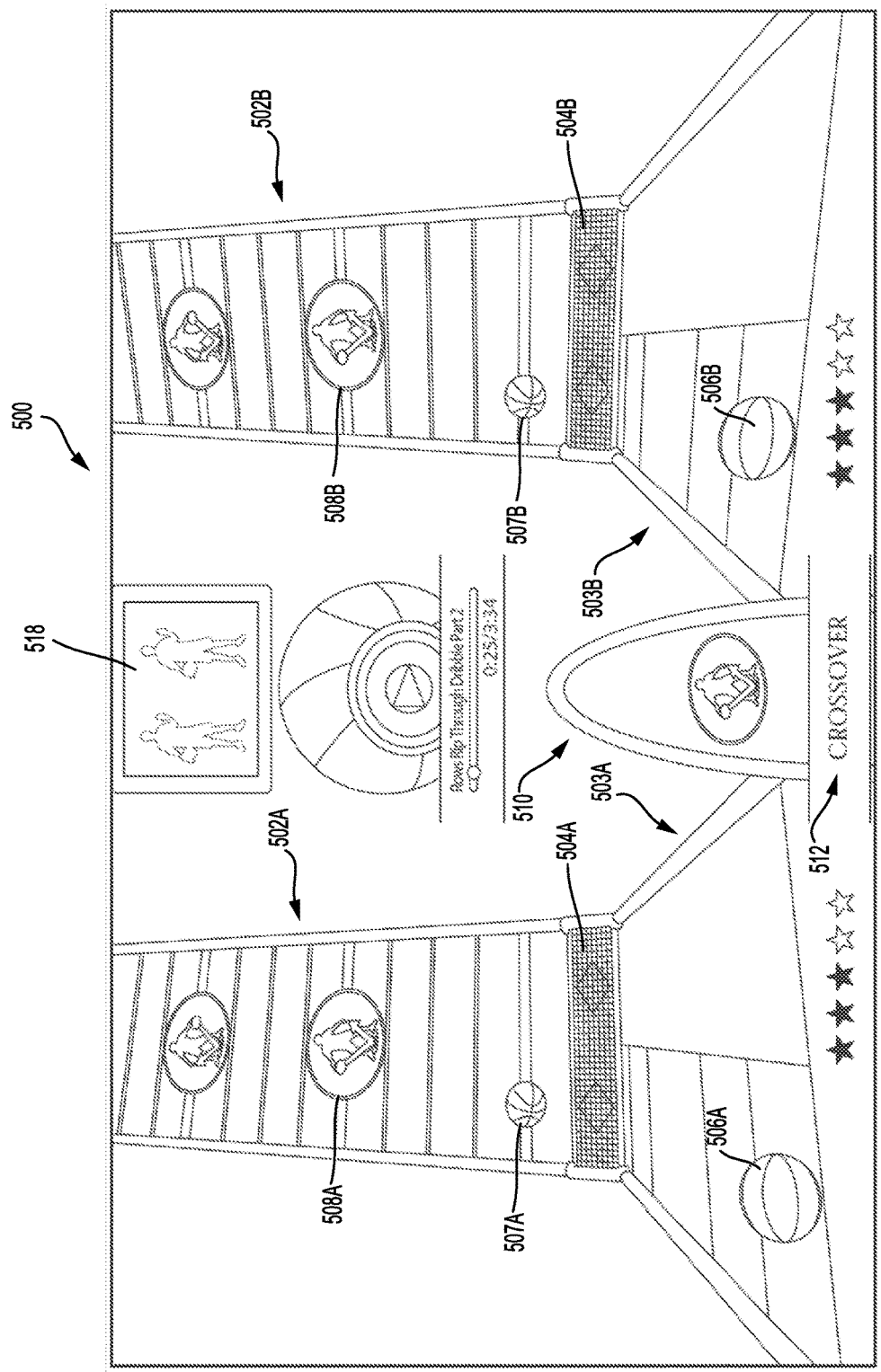
FIG. 5 illustrates an embodiment of an interactive training application of the fitness system for multiple users, in accordance with various embodiments.

FIG. 5 illustrates an interactive application interface 500 for multiple users. Interactive application interface 500 has elements that are similar to those of interactive application interface 400, and are numbered similarly.

The interactive application interface 500 may include two upper tracks 502A-502B and two lower tracks 503A-503B, and two basketball icons 506A-506B reflecting the locations of basketballs 110 of the multiple users. The interactive application interface 500 also may include two intersections 504A-504B of the upper tracks 502A-502B and the lower tracks 503A-503B. As the respective icons 508A-508B travel down the respective upper tracks 502A-502B, the multiple users perform the movements at the appropriate time, as described herein. The movement may also be displayed in a common movement display area 510 and the name of the movement may be displayed in text in movement name section 512. User feedback section 518 may provide an image of the multiple users.

Each user may use one or more basketballs and may participate locally or remotely, on the same or different fitness systems 100. The interactive application interface 500 may connect two or more users training with fitness systems 100 in different locations, as described herein. Alternatively, multiple users can participate locally using the same fitness system 100. The interactive application interface 500 may accommodate one or more users. In various embodiments, the interactive application interface 500 can accommodate five or more users, locally or remotely. Multiple users may compete while the interactive application interface 500 displays scoring and feedback for multiple users simultaneously.

Figure 6:
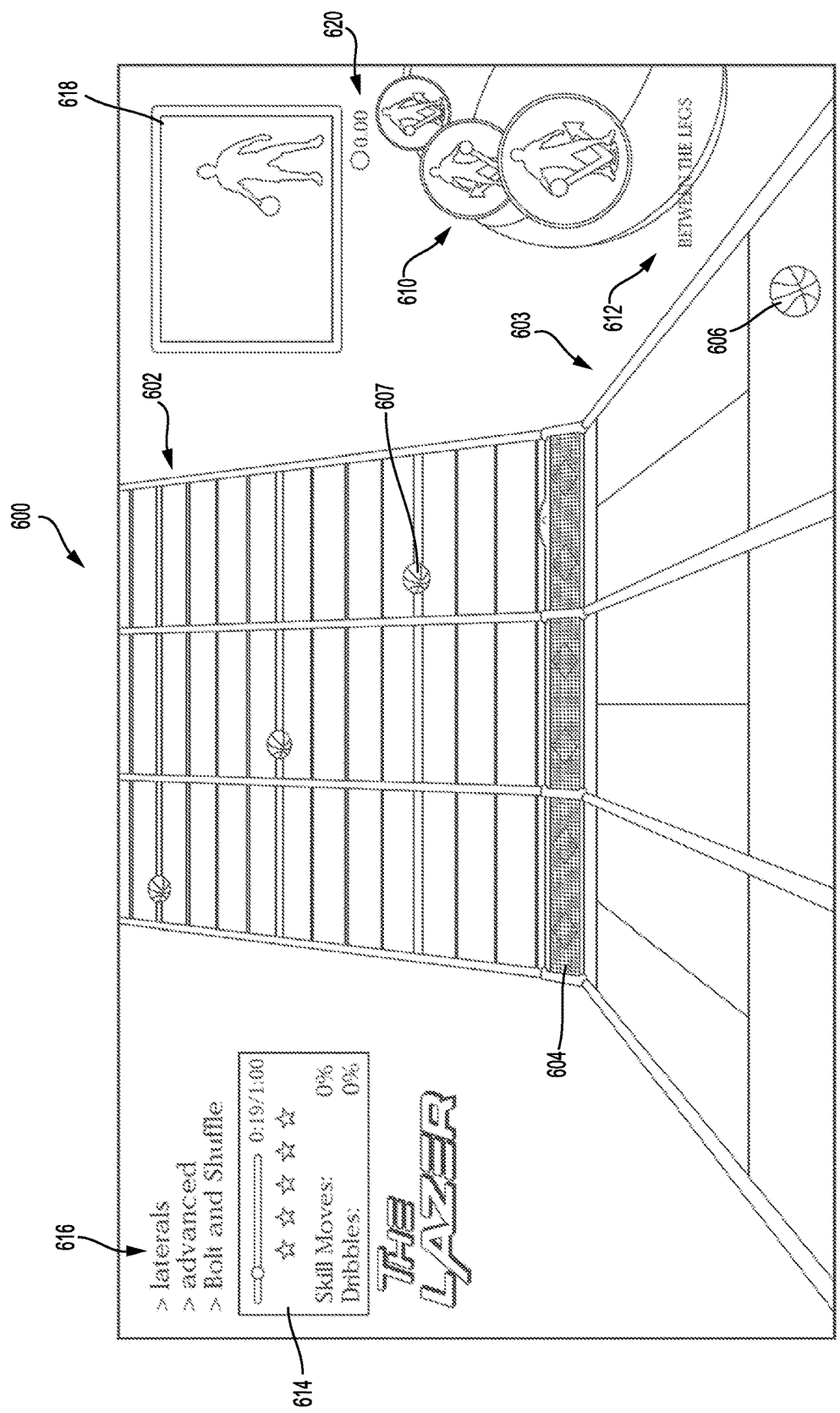
FIG. 6 illustrates another embodiment of an interactive training application of the fitness system for a single user, in accordance with various embodiments.

FIG. 6 illustrates an interactive application interface 600 for a particular interactive training application which incorporates a laterally expanded track, which may be configured similarly to three upper tracks and three lower tracks, as shown in FIGS. 4 and 5, and resulting in six or more total possible locations for the basketball 110 to be dribbled. As the basketball 607 travels down the upper track 602, the user dribbles a basketball 110 (reflected by basketball 606 in lower track 603) to match when the basketball 607 reaches the intersection 604 of the upper track 602 and the lower track 603. In addition to basketball 607, icons representing movements may be presented, with a carousel 610 providing a preview of upcoming movements and the name of the next upcoming movement provided in text 612. As each icon or basketball 606 appears in an adjacent track within upper track 602, the position of the icon or basketball 606 may prompt user to move laterally across the floor to perform the prompted movement. Lower track 603 may define training zones, such as three adjacent zones, which correspond to areas in which the user may physically move to, using lateral footwork movement, throughout the training session. Each of the three adjacent training zones of lower track 603 is illustrated with two dribbling zones, however lower track 603 may include fewer or additional training zones and/or dribbling for lateral movement training. Additionally, interactive application interface 600 may include upper and lower tracks that define training zones which prompt user to move forward and backward while performing a prompted movement.

Interactive application interface 600 may be configured to determine whether the user has correctly performed the prompted movement and whether that movement was performed in the correct training zone. Interactive application interface 600 also may include user's score 614, information area 616, user feedback area 618, and capture quality indicator 620, each similar to respective elements in FIG. 4.

Figure 7:
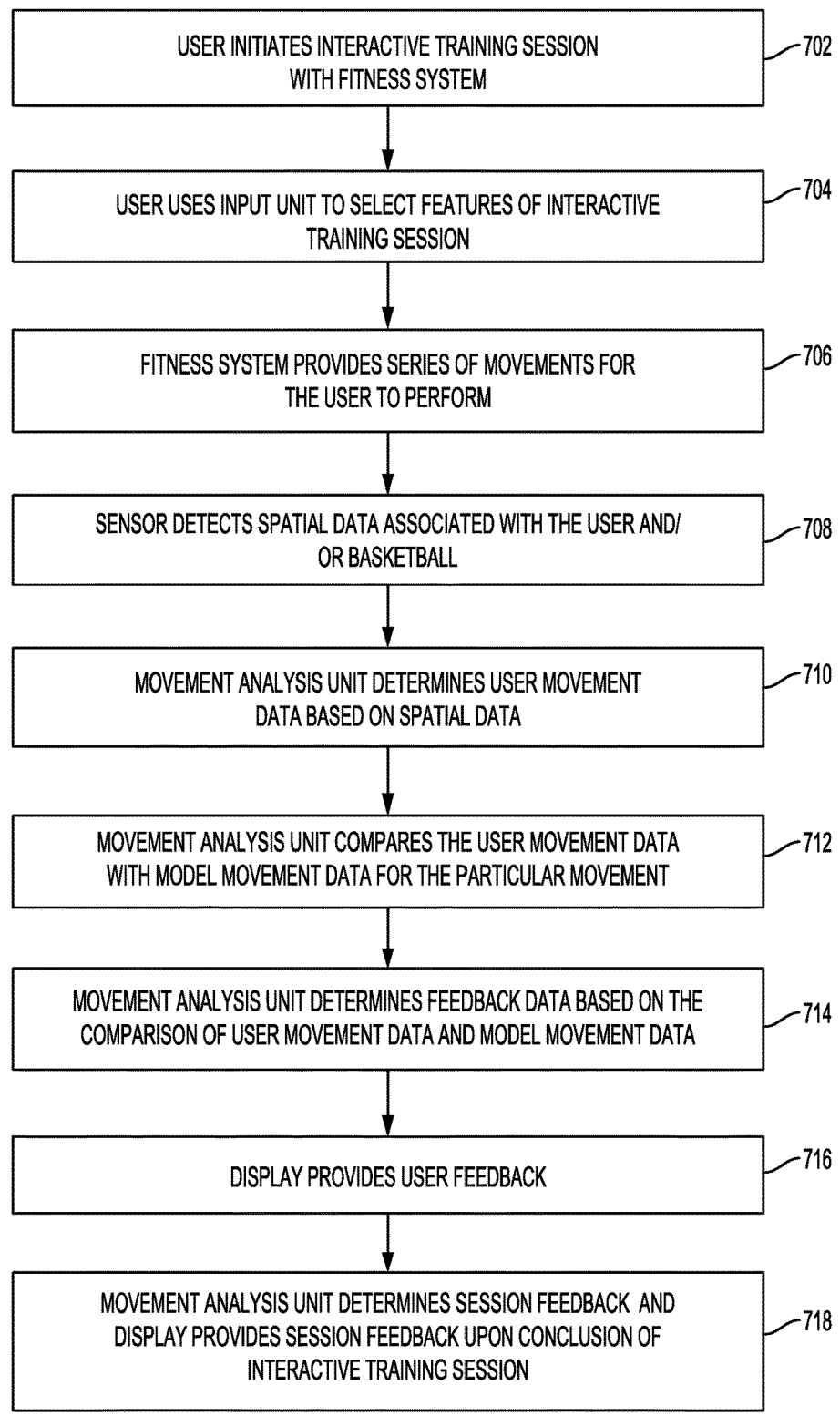
FIG. 7 illustrates a flow chart of the operation of the fitness system, in accordance with various embodiments.

FIG. 7 illustrates a flow chart of the operation of the fitness system 100. The user initiates an interactive training session with fitness system 100 (step 702). In initiating the interactive training session, the user may engage with a user interface provided by display 104, and may listen to speakers 112. Fitness system 100 may be configured to accept currency or credits using a payment processing unit 156 as described herein, or to not require payment before beginning the interactive training session. When the fitness system 100 is in an arcade setting, the user may initiate the interactive training session by placing currency or a token into a payment receptacle connected to the payment processing unit 156, or the user may swipe a payment card to begin the session. In a gym or fitness club setting, the interactive training session may be available for gym members to initiate without use of currency, and upon pushing a button or otherwise engaging with fitness system 100, such as with a camera-recognized movement or by voice command.

The user may use an input unit 106 to select features of their interactive training session through the user interface provided by the display 104 (step 704). Features may include skill level (beginner, intermediate, advanced), number of players (one or more), local or remote multiplayer option (if multiple players), workout type including offensive skills, defensive skills, cardiovascular training, or lateral movement training (or a combination thereof), number of basketballs to be used by each user, signature movement (such as a professional basketball player's move), rhythm or non-rhythm based training, and other modes and features.

The fitness system 100 provides a series or sequence of basketball skill-based movements, which the user performs or attempts to perform (step 706). In various embodiments, fitness system 100 uses display 104 and/or speakers 112 to convey the movements. The movement analysis unit 150 may access the movement database 152 to retrieve a set of movements. The movement analysis unit 150 configures display 104 to display each of the movements in the set of movements, including a particular movement. Configuring the display 104 to display the particular movement prompts the user to perform an action corresponding to the particular movement. The displayed movements may include real basketball skills that a basketball player would use in an actual basketball game on a basketball court. Thus, in performing and matching the displayed movements, the user practices basketball skills that are useful in a live basketball game.

The sensor 102 detects spatial data associated with the user and/or a basketball (step 708). In various embodiments, the sensor 102 is a camera system configured to detect the position of various points of the user's body and the basketball over time. Camera system may include a depth camera for sensing and mapping objects in the training area, such as the user and basketball, in real time.

The movement analysis unit 150 determines user movement data based on the detected spatial data (step 710). In various embodiments, the movement analysis unit 150 performs skeletal mapping based on the spatial data to determine the user movement data. In various embodiments, the movement analysis unit 150 determines locations of various joints and body parts based on the spatial data and determines the user movement data based on the determined locations of various joints and body parts, such as arms, elbows, legs, knees, wrists, ankles, head, hands, feet, and the basketball.

The movement analysis unit 150 compares the user movement data with model movement data associated with the particular movement to determine if the particular movement was successfully performed (step 712). In various embodiments, a deviation between the user movement data and the model movement data is determined, and when the deviation exceeds a predetermined threshold value, the movement analysis unit 150 determines that the particular movement was not successfully performed. In various embodiments, when the deviation between the user movement data and the model movement data is below the predetermined threshold value, the movement analysis unit 150 determines that the particular movement was successfully performed.

The movement analysis unit 150 determines user feedback data based on the comparison of the user movement data and the model movement data (step 714). In various embodiments, the user feedback data is used to provide user feedback. The user feedback may be an indication of whether the movement was successfully performed or not successfully performed. The user feedback may be a numerical value of the deviation between the user movement data and the model movement data. The user feedback may be an indication expressed in symbols, such as stars illustrating user score 414 in FIG. 4.

The movement analysis unit 150 configures the display 104 to display the user feedback based on the user feedback data (step 716). In various embodiments, the user feedback is simply a reflection of the user's actions, as detected by the sensor 102. The movement analysis unit 150 determines the user feedback based on the spatial data detected by the sensor 102 and configures the display 104 to reflect the actions of the user, as shown in user feedback area 418 of FIG. 4. As described herein, audio and visual feedback may be provided in real-time. Display 104 and/or speakers 112 verify to the user whether each displayed movement was matched as the movement is performed.

Each movement in the set of movements is presented, the user performs a movement corresponding to each of the presented movements, and feedback data is provided for each of the performed movements. Performing each of the movements in the set of movements may provide a workout for the user.

Upon conclusion of all or a subset of the movements in the set of movements, the movement analysis unit determines session feedback data and the display 104 may be configured to display session feedback based on the session feedback data (step 718). The session feedback may include a score or rating, a percentage or successful movements, a quantity of points earned, physical information about the player such as heart rate, calories burned, or other physical milestone. The session feedback may also include a personalized audio and/or video of a coach or instructor providing feedback, motivation, and/or instructions for improvement. Display 104 may be configured to display session feedback during a training session and/or after a training session. Session feedback may be provided by display 104, including over or in front of upper track 402, lower track 403, in movement demonstration section 422, or at another portion of display 104. For example, movement analysis unit 150 may determine that a user has reached a physical milestone, and a pre-recorded video message may be displayed to notify or congratulate the user on the milestone. As another example, movement analysis unit 150 may determine that a user missed one or more movement goals, and a pre-recorded video message may be displayed to motivate and encourage the user.

Results of the training session may be saved or stored by movement analysis unit 150, which may be configured to track and analyze a user's performance and training history. In various embodiments, movement analysis unit 150 may be configured to determine a user's progress based on historical and present results for the user and may be further configured to determine the user's skill development over time. Display 104 may be configured to display feedback based on a plurality of previous training sessions completed by the user.

Movement analysis unit 150 may include one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or a combination thereof.

The system may communicate with a smartphone, the internet and/or social networking websites. Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE® TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, components, modules, and/or engines of the system may be implemented as microapplications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system may communicate with any network. As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE® talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE® ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

The system may also create, maintain and/or supplement a user profile. A "user profile" or "user profile data" may comprise any information or data about a consumer that describes an attribute associated with the consumer (e.g., a preference, an interest, demographic information, personally identifying information, and the like).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fitness system for training a user to perform basketball movements, the fitness system comprising:
    a sensor configured to detect spatial data associated with the user and a basketball, wherein the sensor is disposed remotely from the basketball;
    a display configured to provide a visual prompt associated with a particular movement, a real-time visual representation of the relative movement of the user and the basketball, and user feedback, wherein the display is positioned remotely from the user;
    a movement database configured to store a plurality of movements including the particular movement, each movement including model movement data; and
    a movement analysis unit connected to the sensor, the display, and the movement database, the movement analysis unit configured to:
        retrieve model movement data associated with the particular movement from the movement database,
        determine user movement data based on the spatial data,
        compare the user movement data and the model movement data,
        determine user feedback data based on the comparison of the user movement data and the model movement data, and
        configure the display to display the user feedback based on the user feedback data; and
    a housing configured to at least partially enclose each of the sensor, the display, the movement database, and the movement analysis unit; wherein the movement analysis unit is configured to parse the spatial data to determine a position of the basketball relative to a position of the at least two of at least one of the user's elbows, hands, wrists, forearms, hips, knees, ankles, and feet; wherein the parsing comprises determining a first data point in three dimensional coordinates associated with the basketball, and determining a second data point in three dimensional coordinates associated with at least one of the user's elbows, hands, wrists, forearms, hips, knees, ankles, and feet.

2. The fitness system of claim 1, wherein the fitness system further comprises an input unit configured to receive a user input associated with a training set, wherein the training set includes a set of movements including the particular movement.

3. The fitness system of claim 1, wherein the user feedback includes an audio feedback component and the fitness system further comprises a speaker configured to provide the audio feedback component of the user feedback.

4. The fitness system of claim 1, wherein the fitness system further comprises a transceiver configured to receive new movement data associated with a new movement, and wherein the movement database is configured to store the new movement data.

5. The fitness system of claim 1, wherein the user movement data and the model movement data are each a set of data points associated with body parts of the user and the basketball, and
    wherein comparing the user movement data and the model movement data comprises comparing the respective sets of data points.

6. The fitness system of claim 5, wherein the comparing the respective sets of data points comprises determining a deviation between the respective sets of data points.

7. The fitness system of claim 6, wherein the user feedback is positive feedback when the deviation between the respective sets of data points is less than a predetermined threshold value and the user feedback is negative feedback when the deviation between the respective sets of data points exceeds a predetermined threshold value.

8. The fitness system of claim 1, wherein the display is positioned opposite the front of the user.

9. The fitness system of claim 1, wherein the sensor comprises a red, green, and blue (RBG) camera together with a three-dimensional (3D) infrared depth sensor.

10. A method for providing an interactive training session of basketball movements, the method comprising:
   positioning a display remotely from a user;
   storing, by a movement database, a plurality of movements including a particular movement, each movement including model movement data;
   providing, by the display, a visual prompt associated with the particular movement, the visual prompt configured to instruct the user to perform the particular movement;
   detecting, by a sensor disposed remotely from a basketball, spatial data associated with the user and the basketball;
   providing, by the display, a real-time visual representation of the relative movement of the user and the basketball;
   retrieving, by a movement analysis unit, model movement data associated with the particular movement from the movement database;
   determining, by the movement analysis unit, user movement data based on the spatial data;
   comparing, by the movement analysis unit, the user movement data and the model movement data;
   determining, by the movement analysis unit, user feedback data based on the comparing of the user movement data and the model movement data; and
   providing, by the display, user feedback based on the user feedback data;
   wherein the movement analysis unit is configured to parse the spatial data to determine a position of the basketball relative to a position of the at least two of at least one of the user's elbows, hands, wrists, forearms, hips, knees, ankles, and feet;
   wherein the parsing comprises determining a first data point in three dimensional coordinates associated with the basketball, and determining a second data point in three dimensional coordinates associated with at least one of the user's elbows, hands, wrists, forearms, hips, knees, ankles, and feet.

11. The method of claim 10, further comprising, receiving, by an input unit, a user input associated with a training set, wherein the training set includes a set of movements including the particular movement.

12. The method of claim 10, wherein the user feedback includes an audio feedback component and the method further comprises providing, by a speaker, the audio feedback component of the user feedback.

13. The method of claim 10, wherein the method further comprises receiving, by a transceiver, new movement data associated with a new movement, and storing, by the movement database, the new movement data.

14. The method of claim 10, wherein the user movement data and the model movement data are each a set of data points associated with body parts of the user and the basketball, and wherein comparing the user movement data and the model movement data comprises comparing the respective sets of data points.

15. The method of claim 14, wherein the comparing the respective sets of data points comprises determining a deviation between the respective sets of data points.

16. The method of claim 15, wherein the user feedback is positive feedback when the deviation between the respective sets of data points is less than a predetermined threshold value.

17. The method of claim 15, wherein the user feedback is negative feedback when the deviation between the respective sets of data points exceeds a predetermined threshold value.

18. A fitness system for training a user to perform basketball movements, the fitness system comprising:
   a sensor configured to detect spatial data associated with the user and a basketball, wherein the spatial data corresponds with the basketball and with at least two of at least one of the user's elbows, hands, wrists, forearms, hips, knees, ankles, and feet;
   a display configured to provide a visual prompt associated with a particular movement, a real-time visual representation of the relative movement of the user and the basketball, and user feedback, wherein the display is positioned remotely from the user;
   a movement database configured to store a plurality of movements including the particular movement, each movement including model movement data; and
   a movement analysis unit connected to the sensor, the display, and the movement database, the movement analysis unit configured to:
      retrieve model movement data associated with the particular movement from the movement database,
      determine user movement data based on the spatial data,
      compare the user movement data and the model movement data,
      determine user feedback data based on the comparison of the user movement data and the model movement data, and
      configure the display to display the user feedback based on the user feedback data; and
   a housing configured to at least partially enclose each of the sensor, the display, the movement database, and the movement analysis unit,
   wherein the movement analysis unit is configured to parse the spatial data to determine a position of the basketball relative to a position of the at least two of at least one of the user's elbows, hands, wrists, forearms, hips, knees, ankles, and feet;
   wherein the parsing comprises determining a first data point in three dimensional coordinates associated with the basketball, and determining a second data point in three dimensional coordinates associated with at least one of the user's elbows, hands, wrists, forearms, hips, knees, ankles, and feet.

19. The fitness system of claim 18, wherein the sensor is disposed remotely from the basketball.

* * * * *